United States Patent
Kim et al.

(10) Patent No.: US 7,623,582 B2
(45) Date of Patent: Nov. 24, 2009

(54) APPARATUS AND METHOD FOR ESTIMATING START OF FRAME

(75) Inventors: In-Hyoung Kim, Seongnam-si (KR); Tae-Gon Kim, Seoul (KR); Yun-Sang Park, Suwon-si (KR); Bong-Gee Song, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 598 days.

(21) Appl. No.: 11/288,707

(22) Filed: Nov. 29, 2005

(65) Prior Publication Data

US 2006/0115025 A1 Jun. 1, 2006

(30) Foreign Application Priority Data

Nov. 29, 2004 (KR) ...................... 10-2004-0098818

(51) Int. Cl.
*H04L 27/28* (2006.01)
(52) U.S. Cl. ....................... 375/260; 375/343; 375/259; 370/69.1; 370/320; 370/335; 370/342; 370/441; 370/479; 370/515; 455/59; 327/1; 327/100; 706/300; 706/422; 706/813; 706/819
(58) Field of Classification Search ................. 375/260, 375/343, 259; 370/69.1, 320, 335, 342, 441, 370/479, 515; 455/59; 327/1, 100; 708/300, 708/422, 813, 819
See application file for complete search history.

(56) References Cited

U.S. PATENT DOCUMENTS 6,137,847 A * 10/2000 Stott et al. .................. 375/344
6,459,745 B1 10/2002 Moose et al.
(Continued)

FOREIGN PATENT DOCUMENTS

EP 1 313 283 5/2003
(Continued)

OTHER PUBLICATIONS

Keller T et al: "Orthogonal Frequency Division Multiplex Synchronisation Techniques for Wireless Local Area Networks", Seventh IEEE International Symposium on Personal, Indoor and Mobile Radio Communications, vol. 3, Oct. 15, 1996.
(Continued)

*Primary Examiner*—Shuwang Liu
*Assistant Examiner*—Helene Tayong
(74) *Attorney, Agent, or Firm*—The Farrell Law Firm, LLP

(57) ABSTRACT

Disclosed is an apparatus and method for estimating a start point of a frame in a wireless communication system. The method includes the steps of receiving a frame and estimating the start of the frame by searching for an interval or point of time during or at which a correlation between preambles is at its maximum. At this time, to in order to estimate the start of the frame, a cyclic prefix is used. Thus, a correlation between a cyclic prefix and the last interval of a symbol, which is the same as the cyclic prefix, is calculated and an interval or point of time having the maximum correlation is estimated as the start point of the cyclic prefix. Therefore, the start point of the frame can be accurately estimated based on the start point of the cyclic prefix.

4 Claims, 6 Drawing Sheets

U.S. PATENT DOCUMENTS

2005/0063298 A1* 3/2005 Ling et al. .................. 370/208

FOREIGN PATENT DOCUMENTS

| JP | 10-145324 | 5/1998 |
|---|---|---|
| WO | WO 00/77961 | 12/2000 |
| WO | WO 2004/036861 | 4/2004 |
| WO | WO 2004/049618 | 6/2004 |

OTHER PUBLICATIONS

Zhongjun Wang et al: "Design and Implementation of Timing Acquisition in IEEE 802.11a Wireless LANS", Proceedings of the 2003 Joint Conference of the Fourth International Conference on Information, Communications and Signal Processing, vol. 1, Dec. 15, 2003.

* cited by examiner

APPARATUS AND METHOD FOR ESTIMATING START OF FRAME

PRIORITY

This application claims priority under 35 U.S.C. § 119 to an application entitled "Apparatus and Method for Estimating Start of Frame" filed in the Korean Intellectual Property Office on Nov. 29, 2004 and assigned Serial No. 2004-98818, the contents of which are incorporated herein by reference.

BACKGROUND OF THE INVENTION

1. Field of the Invention

The present invention relates to an apparatus and method for acquiring synchronization using periodically repeated patterns of a preamble.

2. Description of the Related Art

In mobile communication systems, a transmitter transmits a synchronization signal to a receiver and the receiver acquires synchronization using the received synchronization signal. As one of such communication systems, the standardization committee for the IEEE 802.16 standard has recently suggested a communication system adopting an Orthogonal Frequency Division Multiple Access (OFDMA) technique for high-speed data transmission. According to the IEEE 802.16 standard, in an OFDMA communication system, a transmitter transmits a preamble pattern to a receiver and the receiver acquires the start point of a frame, i.e., frame synchronization, using the received preamble pattern.

FIG. 1 illustrates a preamble pattern used for initial synchronization in a communication system. A preamble 10 includes repeated patterns 12, 13, and 14 and a cyclic prefix (CP) 11. In OFDMA communication systems, symbol transmission is performed on a symbol-by-symbol basis, but an Orthogonal Frequency Division Multiplexed (OFDM) symbol is affected by previous OFDM symbols during transmission through a multipath channel. To avoid such interference between OFDM symbols, a guard interval that is longer than a maximum delay spread of the multipath channel is inserted between consecutive OFDM symbols. To prevent the destruction of orthogonality which may occur due to the delay of subcarriers, the last part of a valid symbol interval is copied and inserted into the guard interval, which is called a cyclic prefix.

A technique for estimating the start of a frame has been disclosed in U.S. Pat. No. 6,459,745, (the '745 patent) entitled "Frequency/Timing Recovery for Orthogonal Frequency Division Multiplexed Signals." In the '745 patent, based on the structure of a preamble that includes repeated patterns of a signal having a length L as shown in FIG. 1, a frame synchronization algorithm estimates the start of a frame using a given circumstance that a correlation between the repeated patterns is maximal. In other words, the '745 patent discloses calculating a correlation between a signal received during a time window of a predetermined size and a predetermined delay of the received signal and searching for the start point of a frame using the calculated correlation. For example, when the window size of a preamble is W and the predetermined delay is D (not shown), the structure of an apparatus for estimating the start of a frame is as shown in FIG. 2. In FIG. 2, W and D can be selected from among several values according to the structure of a preamble and the way of implementing the preamble. For example, when a preamble includes 3 repeated patterns, W may be equal to 2L+CP and D may be equal to L.

FIG. 2 is a block diagram illustrating a conventional apparatus for estimating the start of a frame. The apparatus for estimating the start of a frame includes a conjugator 22, a first delayer 24, a correlator 26, a second delayer 28, a summer 30, and a third delayer 32. The conjugator 22 calculates the conjugate of a received signal and outputs the conjugate to the correlator 26. The first delayer 24 delays a received signal by a repetition interval of L and outputs the delayed signal to the correlator 26. The correlator 26 calculates a correlation between the received signal and the delayed signal and outputs the correlation to the summer 30 and to the second delayer 28. The second delayer 28 delays the correlation output from the correlator 26 by a window size W of a preamble and outputs the delayed correlation to the summer 30. The summer 30 sums the correlation output from the correlator 26 and the delayed correlation output from the second delayer 28. The third delayer 32 delays a value output from the summer 30 by 1 and outputs the result to the summer 30. Since the output of the second delayer 28 is subtracted from a value resulting from operations of the third delayer 32 and the summer 30 that continuously sum outputs of the correlator 26, the second delayer 28, the third delayer 32 and the summer 30 function together to sum up the outputs of the correlator 26 only during a W of a preamble.

The correlation is determined by Equation 1 as follows.

$$C(n) = \sum_{k=0}^{N-1} r(n+k) \cdot r^*(n+k+D) \quad \text{Equation 1}$$

When $n_0$ is the start point of a frame, C(n) has the maximum value (or peak value) at $n=n_0$. Thus, the start point of a preamble, i.e., the start point of the frame, can be estimated by searching for a position in which |C(n)| is maximal within a predetermined interval of n.

Such a conventional technique is based on the assumption that a preamble is comprised of repeated patterns of a signal having a length of L. This assumption cannot be satisfied when a high-level interference signal is input. To create a preamble having repeated patterns in a multi-carrier system such as an OFDM system, a 0 should be periodically inserted between transmission signals in a frequency domain and the transmission signals should be converted into time-domain signals through inverse fast Fourier transform (IFFT) for transmission. For example, in the case of a preamble suggested in an IEEE 802.16e communication system, a signal is inserted into only one of three subcarriers, and the other two subcarriers are each filled with a "0" and then undergo an IFFT. Thus, the preamble includes three repeated patterns.

However, when a preamble having such a structure is created in a multi-sector environment, a position in which a signal is to be inserted varies from cell to cell, thereby preventing performance degradation caused by interference in sector ID estimation or channel estimation using a preamble.

FIG. 3 is a graph illustrating the use of frequencies and their respective sectors in a multi-sector environment in a wireless communication system. In a wireless communication system, a cell can be divided into a plurality of sectors. Each sector has three repeated patterns by inserting a signal into only one of three subcarriers and filling the other two subcarriers with 0s and performing IFFT on the two subcarriers in a frequency domain. However, in the multi-sector environment, signals of sectors are mixed at the boundary between the sectors. Therefore, a received signal may actually include signals from more than the sector and may even contain signals from all three sectors, thus, increasing the likelihood of receiving a signal other than a 0. As a result, as shown in the embodiment of FIG. 3, frequency-domain signals having no 0s are filled in all the subcarriers, causing weakening of a repeated pattern of a time-domain signal. Thus, conventional techniques based on the repeated pattern of the time-domain signal experience severe performance degradation.

SUMMARY OF THE INVENTION

It is, therefore, an object of the present invention to provide an apparatus and method for estimating a start of a frame, which can compensate for performance degradation caused by an interference signal between sectors in a multi-sector environment.

To achieve the above and other objects, the method according to an embodiment of the present invention estimates the start of a frame by calculating a correlation between preambles upon receipt of a frame and searching for an interval or point of time during or at which the calculated correlation is maximal and uses a cyclic prefix to accurately estimate the start of a frame. The last part of a valid symbol interval is copied and inserted into a preamble or symbol and is called a cyclic prefix. In other words, a cyclic prefix is the same as the last interval of a preamble or symbol. Therefore, an interval or point of time during or at which a correlation between a cyclic prefix and the last interval that is the same as the cyclic prefix is maximal can be estimated as the start position of a cyclic prefix. Thus, an accurate start point of a frame is estimated based on a start point of a cyclic prefix. Also, an embodiment of the present invention variably adjusts a window size and a delay of a correlator to calculate a correlation between preambles and a correlation between cyclic prefixes.

To this end, it is an object of the present invention to provide an apparatus for estimating the start of a frame in a communication system. The apparatus includes a correlator, a control block and a maximum value point output unit. The correlator operates in one of a first mode and a second mode using its variable window size and delay. A correlation for estimation of the start of the frame is output in the first mode and a correlation for the start of a cyclic prefix is output in the second mode. The control block controls the correlator to operate in one of the first mode and the second mode. The correlator inputs a correlation to the maximum value point output unit and the maximum value point output unit outputs a relative position of a maximum correlation among correlations input during a predetermined time interval.

The apparatus further includes a counter and a final point output unit. The counter increases by 1 for every sample of a frame and has the number of samples during a frame interval as a maximum counter value. The final point output unit combines outputs of the maximum value point output unit and outputs a final start point of the frame.

Upon receiving a first frame for estimation of the start of a frame, the control block controls the correlator to operate in the first mode during an interval of the first frame, and then controls the correlator to operate in the second mode during intervals of frames following the first frame.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the following description, a detailed description of known functions and configurations incorporated herein has been omitted for conciseness.

A configuration and operation of an apparatus for estimating a start of a frame according to an embodiment of the present invention will now be described with reference to FIGS. 4 through 7.

Figure 1:
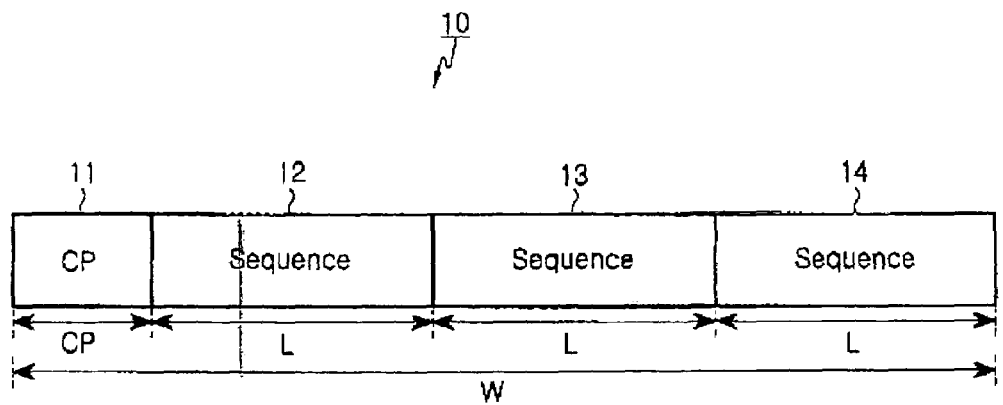
FIG. 1 is a diagram illustrating a preamble pattern used for initial synchronization in a communication system.
Figure 2:
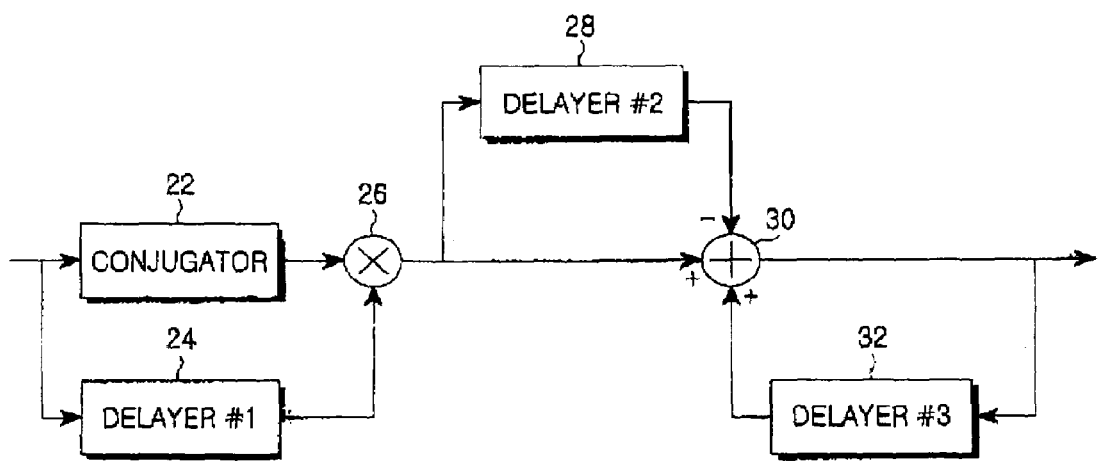
FIG. 2 is a block diagram illustrating a conventional apparatus for estimating a start of a frame.
Figure 3:
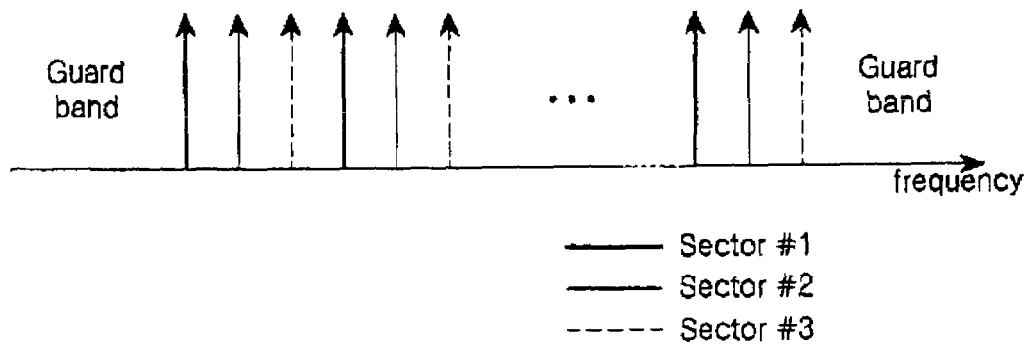
FIG. 3 is a graph illustrating an exemplary use of frequencies and their respective sectors in a multi-sector environment in a wireless communication system.
Figure 4:
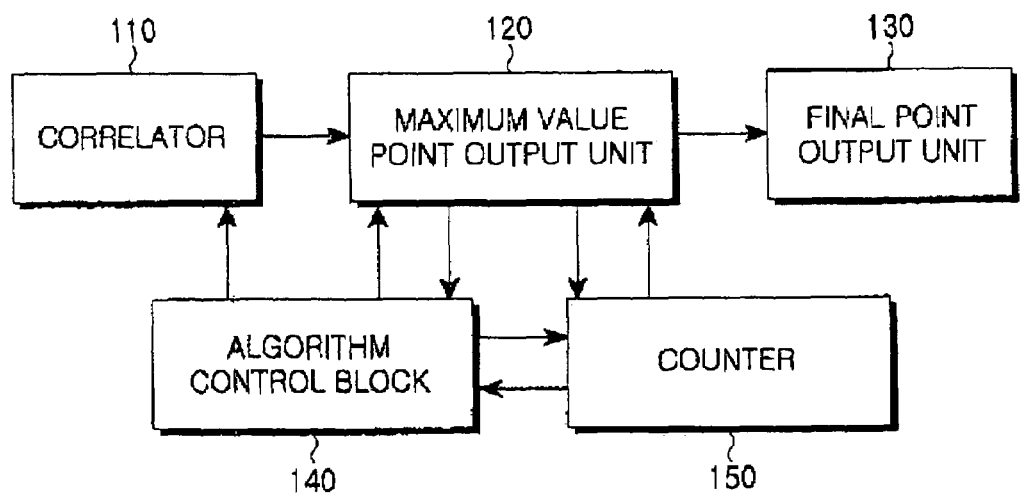
FIG. 4 is a block diagram illustrating an apparatus for estimating a start of a frame according to a preferred embodiment of the present invention.

FIG. 4 is a block diagram illustrating an apparatus for estimating the start of a frame according to a preferred embodiment of the present invention. The apparatus for estimating the start of a frame includes a correlator 110 having a variable window size and a variable delay, a maximum value point output unit 120 for returning (or outputting) the relative position of the maximum value among values input during a predetermined time interval, an algorithm control block 140 for controlling the apparatus, a counter 150 whose maximum value is equal to the number of samples ($T_S$) of a frame, and a final point output unit 130 for combining outputs of the maximum value point output unit 120 and outputting a start point of a final frame.

Figure 5:
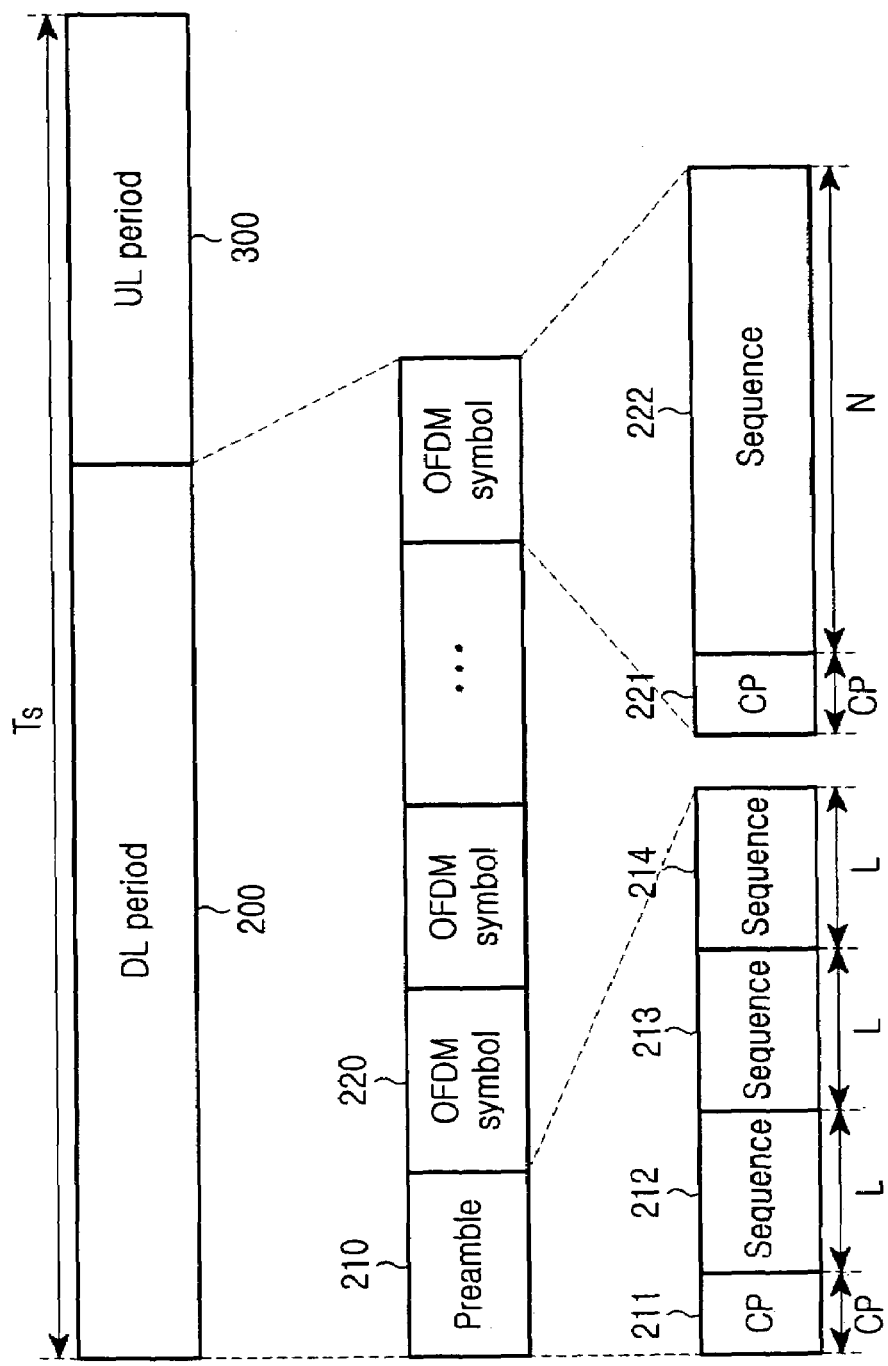
FIG. 5 is a diagram illustrating a general frame structure including a preamble and OFDM symbols.

FIG. 5 is a diagram illustrating a general frame structure including a preamble and OFDM symbols. A frame includes a downlink frame 200 and an uplink frame 300. In an OFDM/OFDMA system, a subscriber station (not shown) receives the downlink frame 200 from a base station (not shown) and transmits the uplink frame 300 to the base station. The downlink frame 200 includes a preamble 210 and OFDM symbols 220. The preamble 210 includes a cyclic prefix (CP) 211 and repeated patterns 212, 213, and 214. The cyclic prefix 211 has a window size CP and each of the repeated patterns 212, 213, and 214 has a window size L.

The apparatus for estimating the start of a frame according to an embodiment of the present invention estimates the start of a frame by calculating a correlation between preambles upon receipt of a frame and searching for an interval or point of time during or at which the correlation is maximal. The apparatus for estimating the start of a frame also uses a cyclic prefix to accurately estimate the start of a frame. As shown in FIG. 5, the cyclic prefix is included in the preamble 210 and/or the OFDM symbols 220. A signal corresponding to an interval of the cyclic prefix is copied from the last part of a valid symbol interval and is inserted into the preamble 210 or the OFDM symbols 220. In other words, a cyclic prefix is the same as the last interval of a preamble or an OFDM symbol. Therefore, an intervalor point of time during or at which a correlation between a cyclic prefix and the last interval of a preamble or an OFDM symbol is maximal can be estimated as the start position of a cyclic prefix.

Thus, the present invention provides reliability in estimation of the start point of a frame by estimating the start of a preamble in a downlink frame and the start of a cyclic prefix of a preamble.

To this end, the correlator 110 according to an embodiment of the present invention operates in two operation modes designated herein as mode 1 and mode 2. Mode 1 is an operation mode for estimating the start of a frame and mode 2 is an operation mode for estimating the start of a cyclic prefix. In an embodiment of the present invention, the start position of a frame can be detected by implementing only mode 1. However, it is also possible to more accurately detect the start position of a frame by implementing mode 2 within a predetermined error range estimated based on the start position of a frame resulting from the implementation of mode 1.

Figure 6:
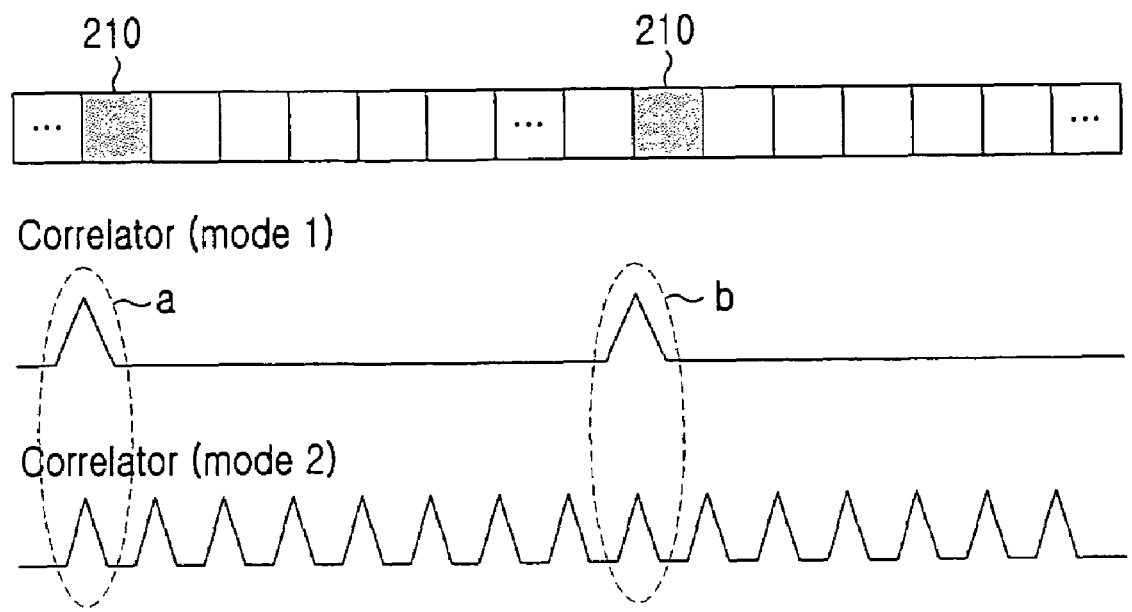
FIG. 6 is a diagram illustrating output results in different operation modes of a correlator according to an embodiment of the present invention.

FIG. 6 is a diagram illustrating output results in different operation modes of the correlator 110 according to an embodiment of the present invention. The correlator 110 outputs the maximum correlation at the start position of each frame in mode 1 and outputs the maximum correlation at the start position of a cyclic prefix of a preamble or symbol in mode 2. The correlator 110 generates the maximum correlation only at the start position of a frame during the correlator's operation in the mode 1 and generates the maximum correlation at the start point of each symbol during the correlator's operation in mode 2. Herein, since the maximum correlation in the mode 1 is sensitive due to an interference signal caused by neighbor sectors, the estimation performance is degraded. However, since an interference signal caused by neighbor sectors also has a symbol structure having a cyclic prefix, the estimation performance using the maximum correlation in mode 2 is not affected by the interference signal caused by neighbor sectors. In an embodiment of the present invention, a start point of a final frame is searched in a combination of the two modes.

More specifically, the correlator 110 has a window size required to sum correlations between repeated patterns of a preamble in mode 1 and a delay for correlation that is equal to an interval of each of the repeated patterns. For example, when there are three repeated patterns as shown in FIG. 5, the correlator 110 has a window size of 2L+CP and a delay of L in mode 1. Moreover, the correlator 110 sums a correlation between the repeated patterns 212 and 213 and a correlation between the repeated patterns 213 and 214 in mode 1 during 2L. The correlator 110 then delays each of the repeated patterns 212, 213, and 214 by the interval of each of the repeated patterns 212, 213, and 214, i.e., L, to acquire corresponding correlations. Thus, the correlator 110 can estimate the start of a preamble in the downlink frame 200, i.e., the start of a frame, in mode 1.

The correlator 110 has a window size required to sum correlations between cyclic prefixes in mode 2, and a delay for correlation is equal to an interval in a preamble or symbol between a cyclic prefix and an interval that is the same as the cyclic prefix. For example, in the case of an OFDM symbol 220 shown in FIG. 5, the correlator 110 has a window size CP and a delay N.

More specifically, the correlator 110 sums a correlation between the cyclic prefix 211 and an interval that is the same as the cyclic prefix 211 and a correlation between the cyclic prefix 221 and an interval that is the same as the cyclic prefix 221 during CP in mode 2. The correlator 110 also delays the cyclic prefixes 211 and 221 by N to acquire a correlation therebetween. Thus, the correlator 110 can estimate the start of a cyclic prefix of a preamble or symbol in mode 2.

The counter 150 increases a counter value by 1 for every sample throughout the entire algorithm execution interval and is reset to 0 when a counter value reaches a value corresponding to a frame interval $T_S$. The counter 150 provides the counter value to the algorithm control block 140 and the maximum value point output unit 120. The maximum value point output unit 120 receives a counter value from the counter 150 and a correlation from the correlator 110 and outputs a counter value at which the correlation is maximal during a frame interval to the algorithm control block 140.

Figure 7:
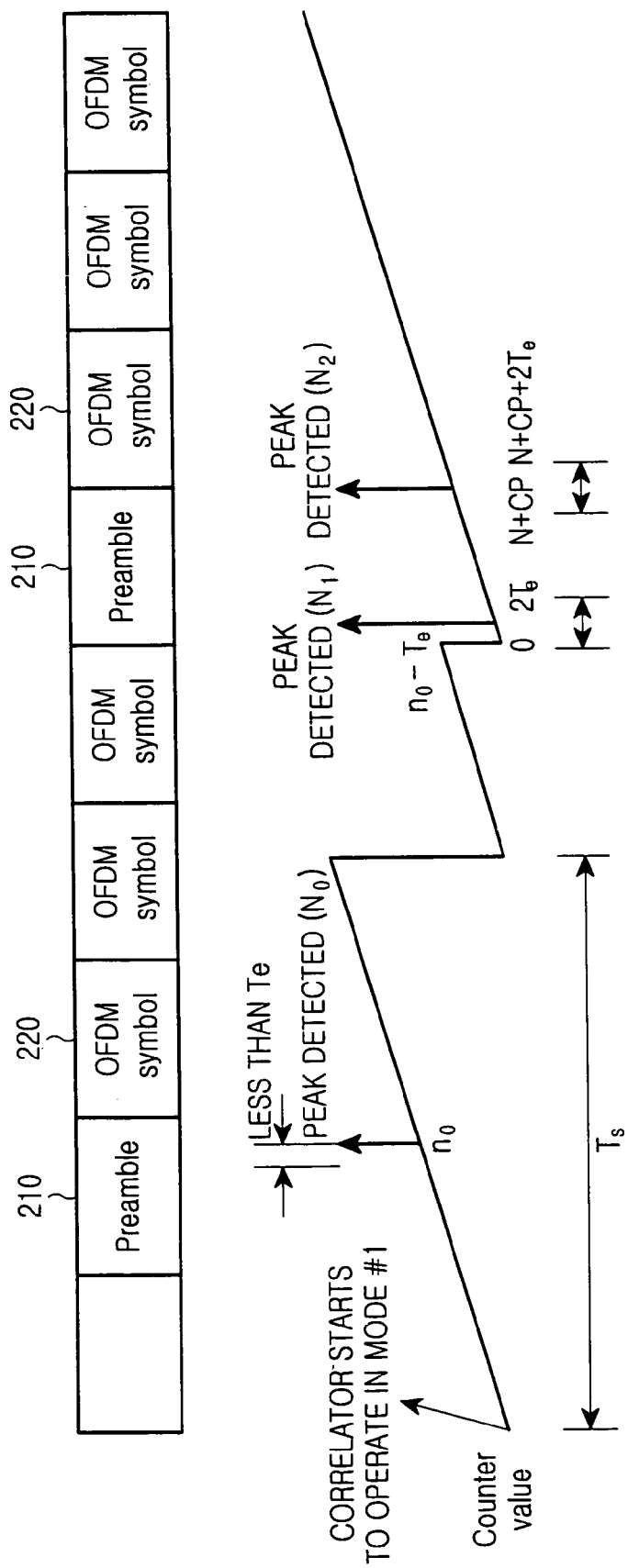
FIG. 7 is a diagram illustrating an operation of the apparatus for estimating the start of a frame according to an embodiment of the present invention.

The operation of the apparatus for estimating the start of a frame will now be described with reference to FIG. 7 which is a diagram illustrating an operation of the apparatus for estimating the start of a frame according to an embodiment of the present invention. The algorithm control block 140 controls the correlator 110 to operate in each of the operation modes. The algorithm control block 140 controls the correlator 110 to operate during an initial frame interval in mode 1. In mode 1, the correlator 110 calculates a correlation between repeated patterns of a preamble and outputs the correlation. The maximum value point output unit 120 outputs a counter value $n_0$ at which the correlation is maximal to the algorithm control block 140, as shown in FIG. 7. Thus, the algorithm control block 140 receives the counter value $n_0$ from the maximum value point output unit 120.

The algorithm control block 140 then resets a counter value to 0 when the counter value reaches $n_0-T_e$ during the next frame interval. $T_e$ is an error range of an estimated value. More specifically, $n_0$ represents a counter value at which a correlation is maximal during a frame interval. A point at which the correlation is maximal is estimated as the start point of a frame, and no has an error range of $\pm T_e$ based on the error range of the estimated start point. The algorithm control block 140 controls the correlator 110 to operate in mode 2 in a counter value range of $[0, 2T_e]$. Thus, the correlator 110 operates in mode 2 from a counter value $n_0-T_e$ to a counter value $n_0+T_e$. In mode 2, the correlator 110 calculates a correlation between a cyclic prefix and the last interval of a preamble or symbol, which is the same as the cyclic prefix, and outputs the correlation. The maximum value point output unit 120 outputs a counter value $n_1$ at which the calculated correlation is maximal to the final point output unit 130.

The algorithm control block 140 then controls the correlator 110 to operate in the mode 2 during an interval of [N+CP, $2T_e$+N+CP] of the next symbol to acquire a correlation with the next cyclic prefix. Thus, the maximum value point output unit 120 outputs a counter value $n_2$ at which the correlation is maximal to the final point output unit 130. The algorithm control block 140 controls the correlator 110 to operate in mode 2 during an interval of [2*(N+CP), $2T_e$+2*(N+CP)] of the next symbol and to output a counter value $n_3$ at which the correlation is maximal to the final point output unit 130. In this way, the algorithm control block 140 estimates the start point of a cyclic prefix for up to (M−1) symbols.

The final point output unit 130 combines estimated start points of a cyclic prefix, which are output from the maximum value point output unit 120, using Equation 2 to estimate a start point of a final frame $\hat{n}_f$ where $\hat{n}_f$ is defined by Equation 2 as follows.

$$\hat{n}_f = \frac{1}{M}\left[\sum_{m=1}^{M}[n_m - (m-1)(N+CP)]\right]$$ Equation 2 where M indicates the number of estimated start points of a cyclic prefix, CP indicates an interval of a cyclic prefix, N indicates an interval of a preamble or symbol excluding CP, N+CP indicates the entire interval of a preamble or symbol, and $n_m$ indicates each of the estimated start points of a cyclic prefix.

If a counter value is reset to 0 at a finally estimated start point, the counter value 0 may be the start point of a frame.

Figure 8:
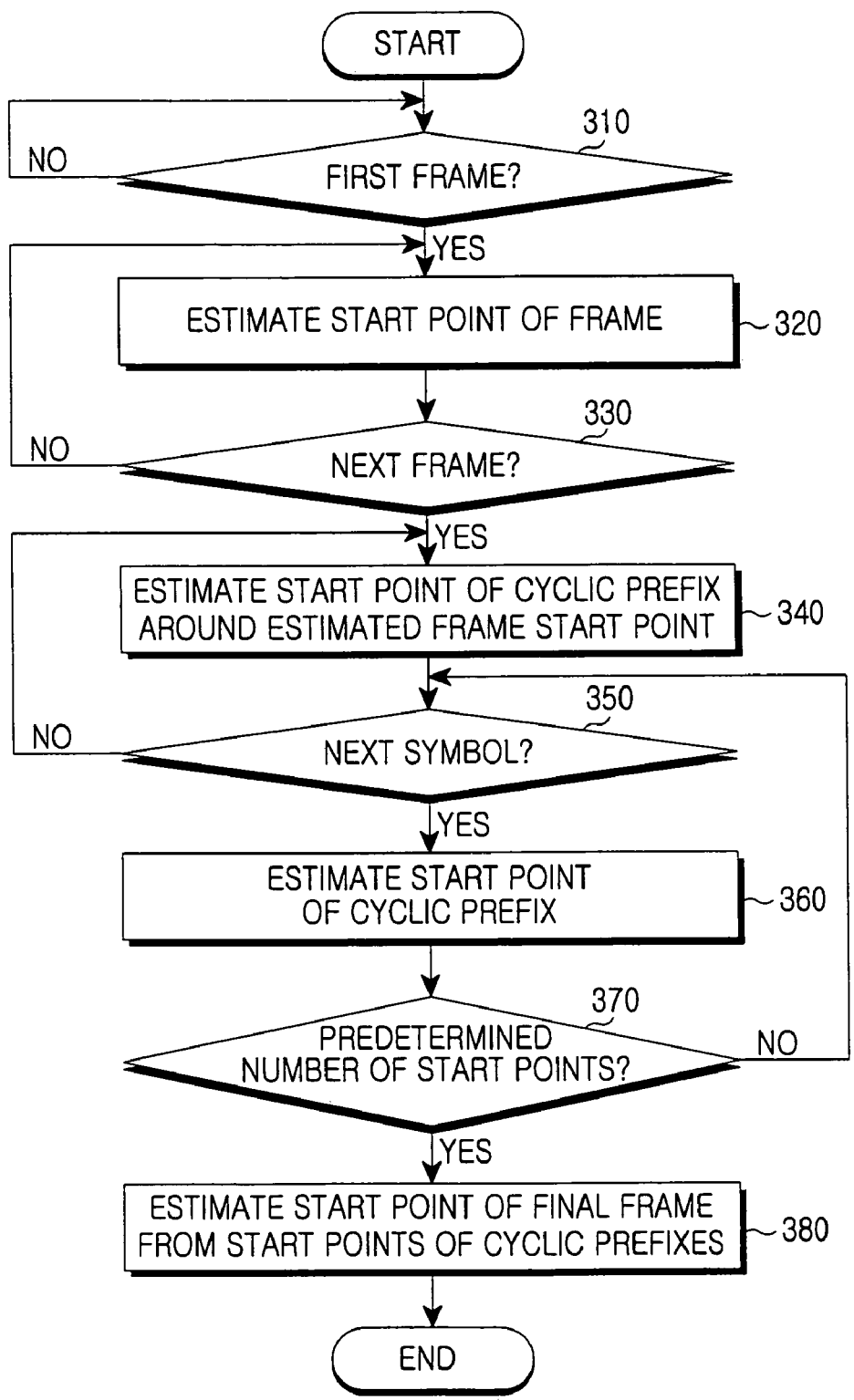
FIG. 8 is a flowchart illustrating a method for estimating the start of a frame according to an embodiment of the present invention.

FIG. 8 is a flowchart illustrating a method for estimating the start of a frame according to an embodiment of the present invention. Upon receiving a frame, the apparatus for estimating the start of a frame determines whether the received frame is the first frame whose start point to be estimated in step 310. If so, the frame start estimation apparatus proceeds to step 320 to estimate the start point of the frame. As mentioned above, the start point of a frame is estimated by calculating a correlation between preambles and searching for an interval or point of time during or at which the calculated correlation is maximal.

The frame start estimation apparatus then proceeds to step 330 to determine whether the next frame is received. If so, the frame start estimation apparatus proceeds to step 340 to estimate the start point of a cyclic prefix around the estimated start point of the frame. In other words, the frame start estimation apparatus calculates a correlation between a cyclic prefix and the last interval of a preamble or symbol, which is the same as the cyclic prefix, outputs the calculated correlation, and estimates a point at which the calculated correlation is maximal as the start point of the cyclic prefix. The frame start estimation apparatus then proceeds to step 370 to determine whether the number of estimated start points of a cyclic prefix reaches a predetermined number. The final start point of a cyclic prefix may be an average of a plurality of estimated start points of the cyclic prefix. Since a communication system transmits frames whose number is sufficient for estimation of the start point of a frame, the frame start estimation apparatus estimates the start point of a cyclic prefix for a predetermined number of symbols.

When the number of start points of a cyclic prefix, which are estimated in step 380, reaches a predetermined number, the frame start estimation apparatus combines the start points of a cyclic prefix, which are estimated in step 380, using Equation 2 to estimate a start point of a final frame.

The start point of a frame may be estimated by implementing only mode 1 as in step 320. However, it is also possible to implement mode 2 as in step 340 within a predetermined error range estimated based on the start point of a frame, resulting from implementation of mode 1, thereby estimating the more accurate start point of the frame.

As described above, according to the present invention, it is possible to accurately estimate the start point of a frame even in a severe interference environment like a multi-sector environment by appropriately combining output results of a correlator having a variable window size and a variable delay for frame synchronization.

The foregoing present invention has been described by taking an example of a system adopting an IEEE 802.16-compliant OFDMA technique, however, can also be applied to a system that achieves frame synchronization based on a delay and a correlation using repeated patterns of a preamble. For example, the present invention can be applied to a general OFDM system having repeated patterns of a preamble.

While the invention has been shown and described with reference to a certain preferred embodiment thereof, it will be understood by those skilled in the art that various changes in form and details may be made therein without departing from the spirit and scope of the invention.

What is claimed is:

1. An apparatus for estimating a start of a frame in a communication system, the apparatus comprising:

a correlator having a variable window size and a variable delay for outputting one of a first correlation for an estimation of a start of the frame and a second correlation for an estimation of a start of a cyclic prefix;

a maximum value point output unit for receiving one of the first correlation and the second correlation output from the correlator and calculating a relative position of a maximum correlation among correlations received during a predetermined time interval to estimate the start of the frame; and a controller for outputting a mode control signal to provide the variable window size and the variable delay to the correlator and controlling the maximum value point output unit, wherein the first correlation is a correlation between repeated sequences of a preamble of the frame, and wherein the second correlation is one of a correlation between the cyclic prefix and a last interval of the preamble, and a correlation between the cyclic prefix and a last interval of an Orthogonal Frequency Division Multiplexing (OFDM) symbol, wherein the correlator implements a first mode having a variable window size of 2L+CP and a variable delay of L that causes the first correlation to be a maximum value at a start point of each frame according to the mode control signal and a second mode having a variable window size of CP and a variable delay of N that causes the second correlation to be a maximum value at the start point of the cyclic prefix of one of the preamble and the OFDM symbol according to the mode control signal, in which the second mode is implemented after the implementation of the first mode during at least one frame interval, and wherein L is a length of the preamble, CP is an interval of the cyclic prefix, and N is one of an interval of the preamble excluding the interval of the cyclic prefix and an interval of the OFDM symbol excluding the interval of the cyclic prefix.

2. The apparatus of claim 1, wherein the controller receives a counter value ($n_0$) at which the first correlation is a maximum value according to the implementation of the first mode and controls the correlator to operate in the second mode when a counter value of a next frame falls within a given error range.

3. The apparatus of claim 2, wherein the controller receives a counter value ($n_1$) at which the second correlation is a maximum value according to the implementation of the second mode and repetitively controls the correlator to operate in the second mode when a counter value of a next frame falls within a given error range.

4. The apparatus of claim 1, wherein the maximum value point output unit estimates the start point ($\hat{n}_f$) of the frame for up to (m−1) symbols using the following equation, $$\hat{n}_f = \frac{1}{M}\left[\sum_{m=1}^{M}[n_m - (m-1)(N+CP)]\right]$$

where M indicates a number of start points of the cyclic prefix, N+CP indicates one of an entire interval of the preamble and an entire interval of the OFDM symbol, and $n_m$ indicates an estimated start point of the cyclic prefix.

* * * * *

UNITED STATES PATENT AND TRADEMARK OFFICE
CERTIFICATE OF CORRECTION

PATENT NO. : 7,623,582 B2  Page 1 of 1
APPLICATION NO. : 11/288707
DATED : November 24, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 958 days.

Signed and Sealed this

Twenty-sixth Day of October, 2010

David J. Kappos
*Director of the United States Patent and Trademark Office*